United States Patent
Veyrat-Masson et al.

(10) Patent No.: US 10,082,444 B2
(45) Date of Patent: Sep. 25, 2018

(54) METHOD FOR DETECTING A FAILURE IN A FUEL RETURN VALVE OF AN AIRCRAFT ENGINE FUEL CIRCUIT

(71) Applicant: SAFRAN AIRCRAFT ENGINES, Paris (FR)

(72) Inventors: Antoine Veyrat-Masson, Paris (FR); Nicolas Gomes, Tours (FR); Lauranne Mottet, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 329 days.

(21) Appl. No.: 15/033,007

(22) PCT Filed: Oct. 27, 2014

(86) PCT No.: PCT/FR2014/052723
§ 371 (c)(1),
(2) Date: Apr. 28, 2016

(87) PCT Pub. No.: WO2015/063400
PCT Pub. Date: May 7, 2015

(65) Prior Publication Data
US 2016/0238484 A1 Aug. 18, 2016

(30) Foreign Application Priority Data
Oct. 30, 2013 (FR) ...................... 13 60636

(51) Int. Cl.
*F02C 7/22* (2006.01)
*G01M 15/00* (2006.01)
(Continued)

(52) U.S. Cl.
CPC .............. *G01M 15/00* (2013.01); *B64D 37/00* (2013.01); *B64D 37/005* (2013.01); *B64D 37/02* (2013.01);
(Continued)

(58) Field of Classification Search
CPC ...... B64D 37/00; B64D 37/005; B64D 37/14; B64D 37/32; F02C 7/232; F02C 9/38;
(Continued)

(56) References Cited

U.S. PATENT DOCUMENTS

| | | | | |
|---|---|---|---|---|
| 4,062,183 A * | 12/1977 | Davies | ............... | F02C 7/228 137/597 |
| 4,238,924 A * | 12/1980 | Kanegae | ............... | F02C 9/28 60/39.281 |
| 4,608,820 A * | 9/1986 | White | ............... | F02C 9/46 251/129.11 |
| 5,493,902 A * | 2/1996 | Glidewell | ............... | F02D 41/22 123/479 |
| 5,685,268 A | 11/1997 | Wakemen | | |
| 5,918,578 A * | 7/1999 | Oda | ............... | F02D 41/22 123/456 |
| 6,655,151 B2 * | 12/2003 | Mahoney | ............... | F02C 9/263 60/39.281 |
| 2007/0175449 A1 * | 8/2007 | Mahoney | ............... | F23K 5/147 123/454 |

(Continued)

FOREIGN PATENT DOCUMENTS

GB  2 287 102 A  9/1995

OTHER PUBLICATIONS

French Office Action dated Jun. 26, 2014 in French Patent Application No. 1360636.

(Continued)

*Primary Examiner* — Jesse Bogue
(74) *Attorney, Agent, or Firm* — Oblon, McClelland, Maier & Neustadt, L.L.P.

(57) ABSTRACT

A method for detecting a failure in a fuel return valve of an aircraft engine fuel circuit, the fuel circuit including a fuel tank, an engine fuel system connected to the fuel tank capable of delivering a flow of fuel to the engine depending on a speed of the engine, a fuel return pipe connected between the engine fuel system and the fuel tank, a fuel return valve arranged to switch between an open and closed position, the valve being capable of blocking the fuel return pipe in the closed position, and of bringing the fuel return pipe into communication with the fuel tank in the open position, the method including measuring a pressure of the flow of fuel from the fuel tank, and if the measured pressure is lower than a predefined threshold, measuring the engine speed.

8 Claims, 3 Drawing Sheets

(51) Int. Cl.
*B64D 37/00* (2006.01)
*B64D 37/14* (2006.01)
*B64D 37/32* (2006.01)
*F02C 7/232* (2006.01)
*F16K 37/00* (2006.01)
*B64D 37/02* (2006.01)
*G01L 19/00* (2006.01)

(52) U.S. Cl.
CPC .............. *B64D 37/14* (2013.01); *B64D 37/32* (2013.01); *F02C 7/232* (2013.01); *F16K 37/00* (2013.01); *G01L 19/0092* (2013.01); *F05D 2260/80* (2013.01)

(58) Field of Classification Search
CPC .. F05D 2260/80; F02D 41/22; F02D 41/3863; F02D 2041/224; F02D 41/221
See application file for complete search history.

(56) References Cited

U.S. PATENT DOCUMENTS

2007/0199314 A1* 8/2007 Futa, Jr. .............. F15B 13/0438
60/399
2008/0296403 A1* 12/2008 Futa, Jr. .................. F02C 7/232
239/95

OTHER PUBLICATIONS

International Search Report dated Jul. 29, 2015 in PCT/FR14/052723 Filed Oct. 27, 2014.

* cited by examiner

METHOD FOR DETECTING A FAILURE IN A FUEL RETURN VALVE OF AN AIRCRAFT ENGINE FUEL CIRCUIT

GENERAL TECHNICAL FIELD

The invention relates to the general field of aircraft engine fuel circuit architectures having a motive flow tapping an engine fuel system.

PRIOR ART

Figure 1:
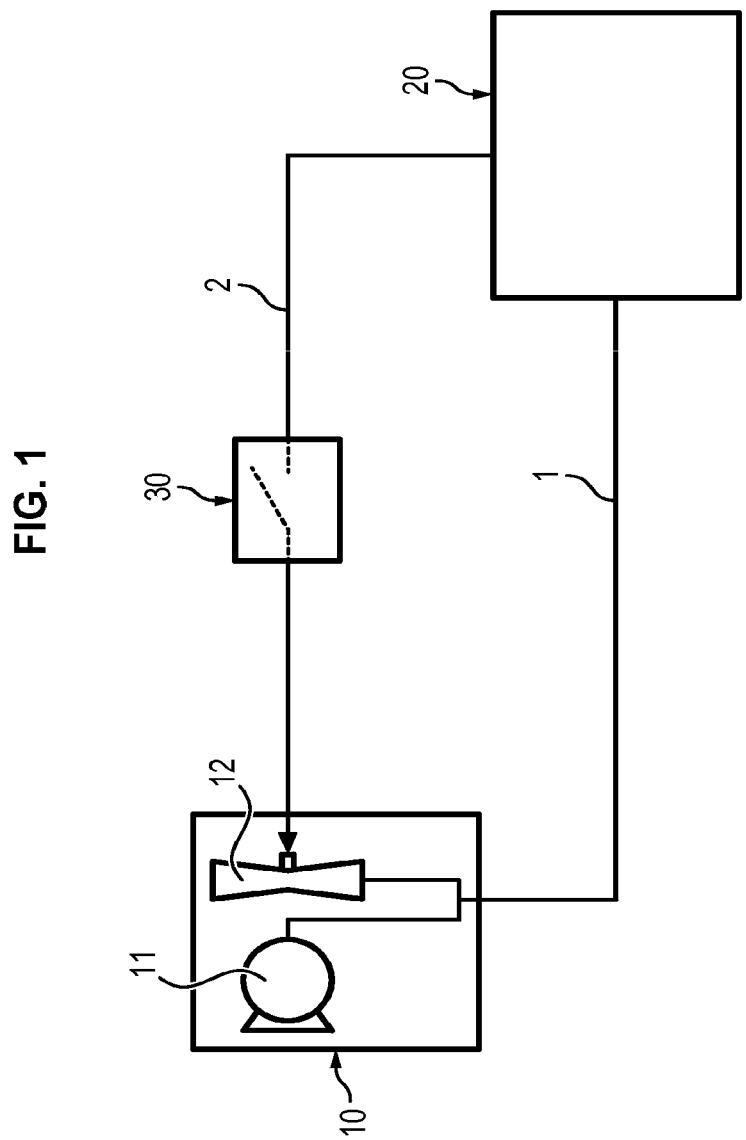

FIG. 1 illustrates a conventional aircraft engine fuel architecture. In such an architecture, an electric pump 11, called the aircraft pump, immersed in a fuel tank 10, makes it possible to send fuel into an engine fuel system 20 of the aircraft through a supply pipe 1.

The engine fuel system 20 especially supplies the engine (not shown) with fuel.

This aircraft pump needs to be supplied with electricity.

To avoid having systematic recourse to this aircraft pump, a jet pump 12 operating using the Venturi effect, is also immersed in the tank 10 and makes it possible to take over from the aircraft pump under certain conditions.

This jet pump 12 needs a hydraulic power source which is in known fashion supplied by a fuel return pipe 2 connected to the engine fuel system 20.

This return pipe 2 makes it possible to send into the jet pump 12 pressurized fuel taken from the engine fuel system 20.

Yet it is not preferable for a fuel flow to be sent from the engine system 20 to the jet pump 12 during startup phases of the engine. However, when the engine has reached its idle speed, this valve has to be open so that the engine is supplied by the jet pump 12.

To accomplish this, a motive flow valve 30 can be positioned along the return pipe 2 so as to block it, under certain speed conditions of the engine.

In particular, this valve 30 must be closed when the engine is stopped and open at speeds above or equal to a predetermined speed, before arriving at idle speed.

It can happen that the valve has a malfunction and stays blocked in open position such that it sends fuel originating from the engine fuel system 20 to the jet pump 12 whereas it should not. This causes degradations in performance of the engine since the fuel flow withdrawn to be sent to the fuel tank causes a reduction in the rate (pressure) of the flow sent to the engine.

There is consequently a need to detect a failure of the motive flow valve.

PRESENTATION OF THE INVENTION

The invention responds to this need and proposes a method for detecting a failure of a motive flow valve of a fuel circuit of an aircraft engine, the fuel circuit comprising
a fuel tank;
a jet pump arranged in the fuel tank;
an engine fuel system connected to the fuel tank, said engine fuel system being capable of delivering a fuel flow to the engine as a function of a speed of said engine;
a fuel return pipe connected between the engine fuel system and the jet pump;
a motive flow valve arranged to switch between an open position and a closed position, said valve being capable of blocking, in closed position, the fuel return pipe and putting, in open position, the fuel return pipe in communication with the jet pump;
the method comprising the following steps performed in a calculator:
measuring pressure of the fuel flow originating from the fuel tank; and if the pressure measured is less than a predetermined threshold,
measuring of the speed of the engine N2.

The method of the invention is advantageously completed by the following characteristics, taken singly or in any of their technically possible combinations:
if the engine speed is less than a predetermined threshold, a detection step of a failure of the motive flow valve, the failure being an open blocked position;
measuring of the pressure of the fuel flow originating from the fuel tank is done by means of a pressure sensor arranged along a pipe connecting the fuel tank to the engine fuel system;
measuring of the engine speed is done by means of a speed sensor;
the predetermined threshold of the pressure is a lowpressure threshold typically Pinf=7 psi;
the predetermined threshold of the engine speed is less than a speed threshold N2 typically N2sup=45% of N2;
the predetermined threshold of the engine speed is greater than a speed threshold N2 typically N2inf=30% of N2.

The invention also relates to a fuel circuit of an aircraft engine, the fuel circuit comprising
a fuel tank;
a jet pump disposed in the fuel tank;
an engine fuel system connected to the fuel tank, said engine fuel system being capable of delivering a fuel flow to the engine as a function of a speed of said engine;
a fuel return pipe connected between the engine fuel system and the jet pump;
a motive flow valve arranged to switch between an open position and a closed position, said valve being capable of blocking, in closed position, the fuel return pipe and putting, in open position, the fuel return pipe in communication with the jet pump;
a calculator configured to perform the following steps:
measuring pressure of the fuel flow originating from the fuel tank; and if the pressure measured is less than a predetermined threshold,
measuring of the speed of the engine N2.

Finally, the invention relates to an aircraft comprising an engine fed with fuel by a fuel circuit according to the invention.

By way of the invention, detection of the failure of the motive flow valve does not require a dedicated position sensor on the valve.

PRESENTATION OF FIGURES

Figure 2:
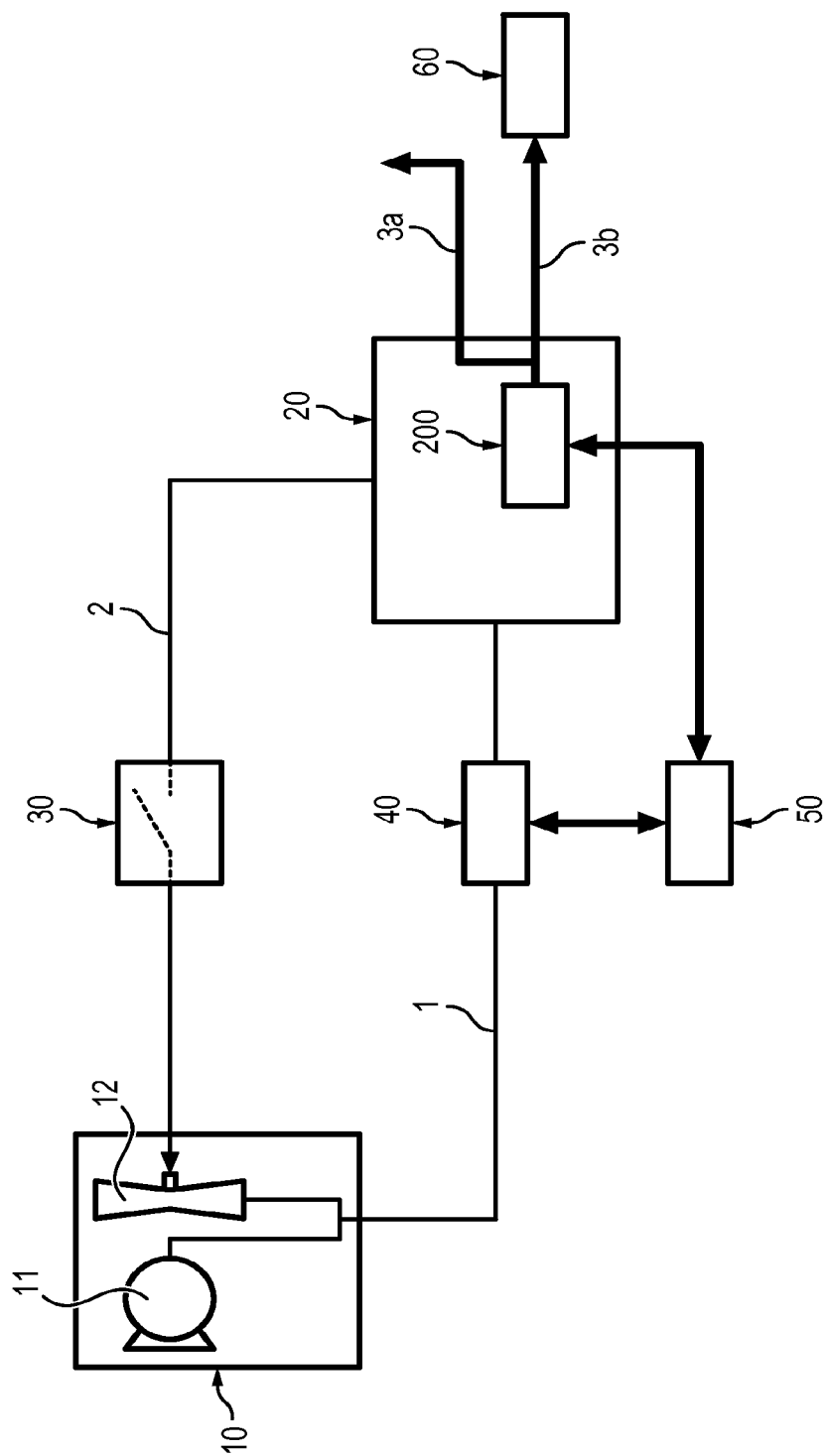
Figure 3:
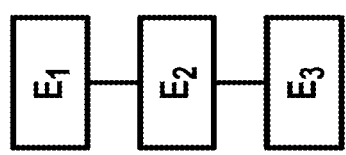

Other characteristics, aims and advantages of the invention will emerge from the following description which is purely illustrative and nonlimiting and which must be considered in conjunction with the appended drawings, wherein, apart from FIG. 1 already discussed, FIG. 2 illustrates architecture of a fuel circuit according to the invention;

FIG. 3 schematically illustrates steps of a method according to the invention.

Figure 4:
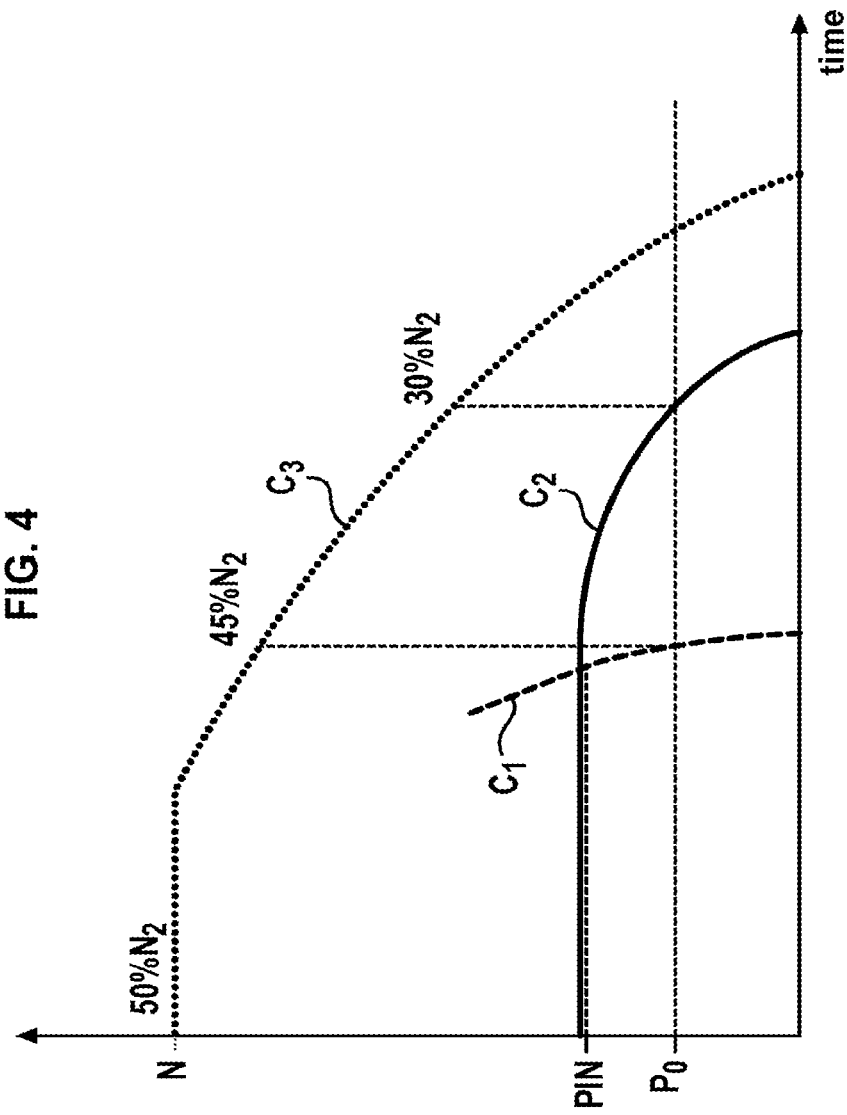

FIG. 4 illustrates evolution of the engine speed fed by the fuel circuit according to the invention and evolution of the operation of a motive flow valve in normal mode and in failure of the fuel circuit according to the invention.

In all figures similar elements have identical reference numerals.

DETAILED DESCRIPTION OF THE INVENTION

In the following "low pressure" means pressure less than Pinf (for example Pinf=7 psi) and "high pressure" means pressure greater than Psup (for example Psup=10 psi).

In relation to FIG. 2, an architecture of a fuel circuit according to an embodiment of the invention comprises, apart from the elements described in relation to FIG. 1, a pressure sensor 40 arranged along the pipe connecting the fuel tank 10 to the fuel system 20. Such a pressure sensor 40 ensures that the pressure of the fuel flow sent into the fuel system 20 is sufficient. Such a sensor is conventionally in connection with the avionics and detects any failure there via the measured pressure.

It is recalled that the fuel system 20 supplies an engine 60 especially by means of a pipe 3.

The fuel circuit of FIG. 2 further comprises a calculator 50 which is configured to perform a method for detecting a failure of the motive flow valve 30 described herein below.

In relation to FIG. 3 a method for detecting failure of the motive flow valve comprises a step E1 for measuring pressure of the fuel flow originating from the fuel tank 10 and if the pressure measured is less than a predetermined threshold, the method comprises measuring E2 of the rotation speed N2 of the engine of the aircraft. Preferably, the predetermined threshold of the pressure is a lowpressure threshold Pinf typically Pinf=7 psi.

A failure is detected E3 if the engine speed N2 measured is less than a predetermined threshold when the pressure sensor 40 detects a move to "low pressure" of the fuel flow. As is preferred, the predetermined threshold of the engine speed is less than a speed threshold N2 typically N2sup=45% of N2.

In fact, in nominal mode the motive flow valve must be strictly open for engine speeds N between a speed threshold N2inf (typically 30% of N2) and a threshold speed N2 slowed to a minimum (typically 50% of N2) or otherwise damage the engine.

By way of advantage, the pressure of the fuel flow is measured by the pressure sensor arranged between the fuel tank 10 and the engine fuel system 20 and the measuring of the engine speed is done by means of a speed N2 sensor 200 of engine rotation of the aircraft.

FIG. 4 shows the variation in pressure Pf of the fuel flow Pf as a function of time according to whether the motive flow valve is in failure (curve C2) or in nominal mode (curve C1). This same figure also shows the variation in engine speed N2 as a function of time (curve C3).

Within the scope of the detection method described here, it is a question of detecting when the pressure of the fuel flow originating from the tank drops below a threshold Pinf called "low pressure" threshold, a predetermined threshold as a function of the speed of the engine.

Therefore, in verifying the speed of the engine N2 when it drops below this threshold Pinf a failure of the motive flow valve is detected.

In other words, within the scope of the detection method, the effective speed N2 of passage to low pressure of the fuel flow originating from the fuel tank is compared to normal speed to verify that the motive flow valve is working properly or on the contrary presents a failure.

The invention claimed is:

1. A method for detecting a failure of a motive flow valve of a fuel circuit of an aircraft engine, the fuel circuit including a fuel tank, a jet pump disposed in the fuel tank, an engine fuel system connected to the fuel tank said engine fuel system being capable of delivering a fuel flow to the engine as a function of a speed of said engine, a fuel return pipe connected between the engine fuel system and the jet pump, a motive flow valve arranged to switch between an open position and a closed position, said motive flow valve being capable of blocking, in closed position, the fuel return pipe and putting, in open position, the fuel return pipe in communication with the jet pump, the method comprising the following steps performed in a calculating circuitry:
   measuring pressure of the fuel flow originating from the fuel tank; and
   if the measured pressure is less than a predetermined threshold, measuring the speed of the engine, and if the engine speed measured is less than a predetermine threshold, a failure of the motive flow valve is determined, the failure being an open blocked position.

2. The method according to claim 1, wherein the measuring of the pressure of the fuel flow originating from the fuel tank is done by means of a pressure sensor arranged along a pipe connecting the fuel tank to the engine fuel system.

3. The method according to claim 1, wherein the measuring of the engine speed is done by means of a speed sensor.

4. The method according to claim 1, wherein the predetermined threshold of the pressure is a low-pressure threshold Pinf, where Pinf=7 psi.

5. The method according to claim 1, wherein the predetermined threshold of the engine speed N2sup is less than a speed threshold N2, where N2sup=45% of N2.

6. The method according to claim 1, wherein the predetermined threshold of the engine speed N2inf is greater than a speed threshold N2, where N2inf=30% of N2.

7. A fuel circuit of an aircraft engine, the fuel circuit comprising:
   a fuel tank;
   a jet pump disposed in the fuel tank;
   an engine fuel system connected to the fuel tank, said engine fuel system being capable of delivering a fuel flow to the engine as a function of a speed of said engine;
   a fuel return pipe connected between the engine fuel system and the jet pump;
   a motive flow valve arranged to switch between an open position and a closed position, said motive flow valve being capable of blocking, in closed position, the fuel return pipe and putting, in open position, the fuel return pipe in communication with the jet pump; and
   calculating circuitry configured to
   measure pressure of the fuel flow originating from the fuel tank; and if the measured pressure is less than a predetermined threshold, measure the speed of the engine, and if the engine speed measured is less than a predetermined threshold, a failure of the motive flow valve is determined, the failure being an open blocked potion.

8. An aircraft comprising an engine supplied with fuel via a fuel circuit according to claim 7.

* * * * *

UNITED STATES PATENT AND TRADEMARK OFFICE
CERTIFICATE OF CORRECTION

PATENT NO. : 10,082,444 B2
APPLICATION NO. : 15/033007
DATED : September 25, 2018
INVENTOR(S) : Antoine Veyrat-Masson et al.

Page 1 of 1

It is certified that error appears in the above-identified patent and that said Letters Patent is hereby corrected as shown below:

In the Claims

Column 4, Line 7, change "fuel tank said" to --fuel tank, said--;

Column 4, Line 20, change "a predetermine" to --a predetermined--; and

Column 4, Line 62, change "potion" to --position--.

Signed and Sealed this
Eighth Day of October, 2019

Andrei Iancu
*Director of the United States Patent and Trademark Office*